(12) United States Patent
Dam-Johansen et al.

(10) Patent No.: US 8,234,985 B2
(45) Date of Patent: Aug. 7, 2012

(54) BOILER PRODUCING STEAM FROM FLUE GASES UNDER OPTIMIZED CONDITIONS

(75) Inventors: Kim Dam-Johansen, Fredericksværk (DK); Peter Jensen, København S (DK); Flemming Frandsen, Havdrup (DK); Ole Madsen, Nærum (DK)

(73) Assignee: Babcock & Wilcox Vølund A/S, Esbjerg (DK)

( * ) Notice: Subject to any disclaimer, the term of this patent is extended or adjusted under 35 U.S.C. 154(b) by 956 days.

(21) Appl. No.: 12/088,256

(22) PCT Filed: Sep. 29, 2006

(86) PCT No.: PCT/IB2006/053560
§ 371 (c)(1),
(2), (4) Date: Oct. 23, 2008

(87) PCT Pub. No.: WO2007/036913
PCT Pub. Date: Apr. 5, 2007

(65) Prior Publication Data
US 2009/0145344 A1    Jun. 11, 2009

(30) Foreign Application Priority Data
Sep. 30, 2005 (DK) .................................. 2005 01372

(51) Int. Cl.
*F23J 11/00* (2006.01)
*F23J 15/00* (2006.01)
*B09B 3/00* (2006.01)
*F23D 14/70* (2006.01)
*F23G 5/00* (2006.01)
*F23G 7/00* (2006.01)
*F23M 9/00* (2006.01)

(52) U.S. Cl. ......... 110/235; 110/148; 110/203; 110/322
(58) Field of Classification Search .................. 110/147, 110/148, 203, 235, 322
See application file for complete search history.

(56) References Cited

U.S. PATENT DOCUMENTS
3,097,631 A * 7/1963 Martin ..................... 122/235.33
(Continued)

FOREIGN PATENT DOCUMENTS
DE      102 57 305      6/2004
(Continued)

OTHER PUBLICATIONS
Machine translation of JP 05223225.*
(Continued)

*Primary Examiner* — Kenneth Rinehart
*Assistant Examiner* — David J. Laux
(74) *Attorney, Agent, or Firm* — Stites & Harbison PLLC; Marvin Petry

(57) ABSTRACT

This invention relates to a boiler (1) drying, igniting and combusting refuse and producing steam (2, 2*a*) by heat exchange with flue gases (3), said boiler defining a main flow direction (5) of gases, said boiler (1) comprising a separator element (4) and an end superheater (8), the separator element (4) being adapted for separating said flue gases (3) into streams of a less-corrosive gas flow (6) and a corrosive gas flow (7), said separator element (4) being located substantially in and along said main flow direction (5), said end superheater (8) being located in proximity to said separator element (4) and in the flow (6) of said less-corrosive gas. Said separator element (4) comprises a plate (4*a*) or a wall (4*b*), which in a number of said separator elements (4) forms a channel as another separator element. This provides for an increased lifetime of said superheater and makes the boiler provide a high and efficient electrical power output.

13 Claims, 2 Drawing Sheets

U.S. PATENT DOCUMENTS

Figure 1:
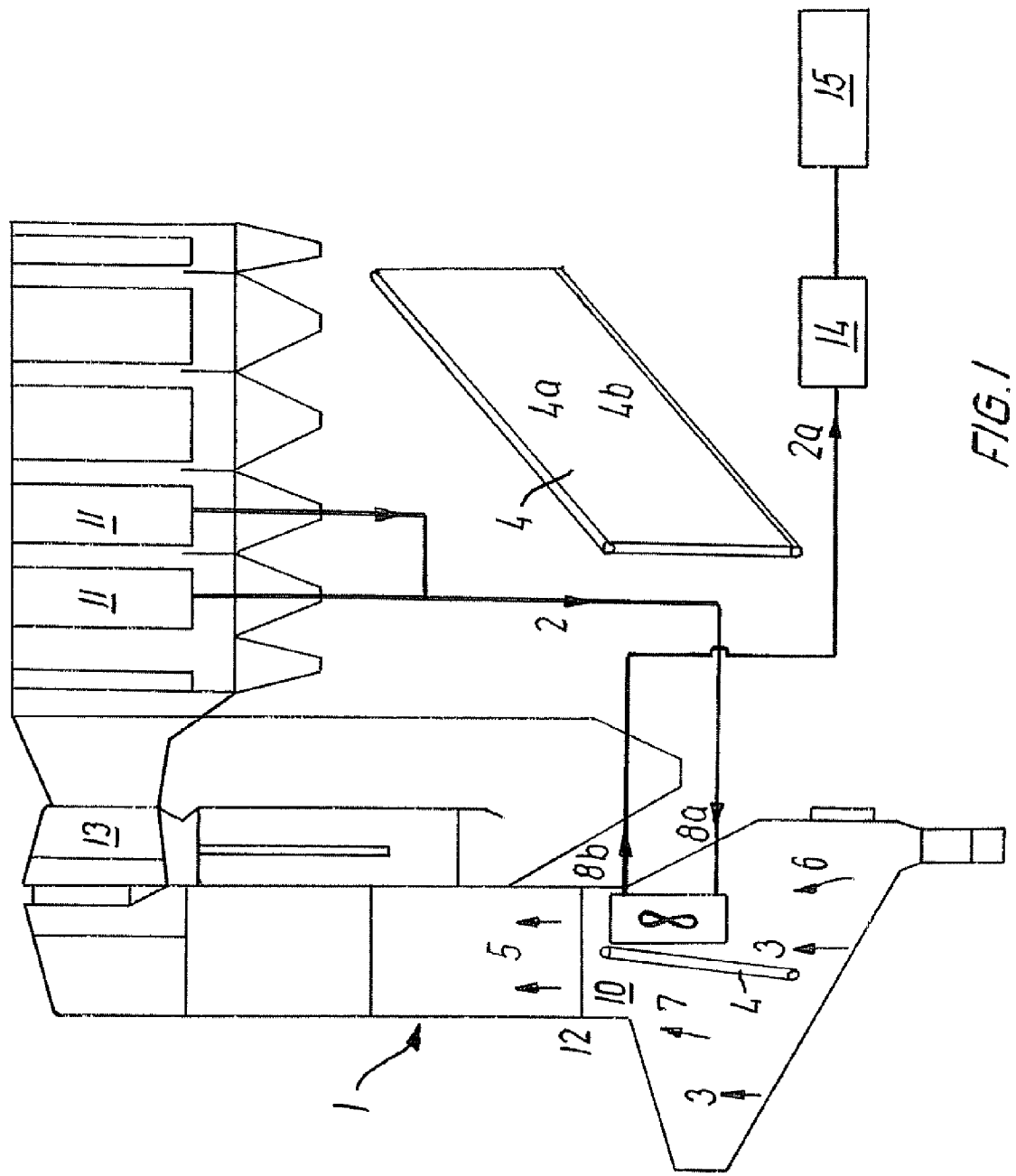

| | | | | |
|---|---|---|---|---|
| 3,421,824 A | * | 1/1969 | Herbst | 110/343 |
| 5,385,104 A | | 1/1995 | Binner | |
| 6,269,754 B1 | * | 8/2001 | Ruegg et al. | 110/234 |
| 7,661,376 B2 | * | 2/2010 | Saviharju et al. | 110/348 |

FOREIGN PATENT DOCUMENTS

| | | | |
|---|---|---|---|
| EP | 1 365 192 | | 11/2003 |
| EP | 1365192 A1 | * | 11/2003 |
| GB | 899 415 | | 6/1962 |
| JP | 05223225 A | * | 8/1993 |
| JP | 05312312 A | * | 11/1993 |
| JP | 6147442 | | 5/1994 |
| JP | 2002267101 | | 9/2002 |

OTHER PUBLICATIONS

Machine translation of JP 05312312.*

The Patent Office of the People's Republic of China, First Office Action for CN Application No. 200680042778.2, Mailed Jan. 22, 2010.

Office Action for JP Patent Application No. 2008-532966, Nov. 29, 2011, Japanese Patent Office.

* cited by examiner

BOILER PRODUCING STEAM FROM FLUE GASES UNDER OPTIMIZED CONDITIONS

TECHNICAL FIELD OF THE INVENTION

The invention relates to a boiler drying, igniting and combusting refuse and producing steam by heat exchange with the flue gases. Subsequently, the steam is utilized to produce electricity.

The refuse to be burnt can be any mixture of household refuse, bark, industrial waste and hospital refuse and other kinds of waste.

BACKGROUND OF THE INVENTION

U.S. Pat. No. 6,269,754 discloses a steam generator for superheated steam for incineration plants with corrosive flue gases. It essentially comprises a radiation section and a convection section, having at least one superheater and having plates arranged on the inside of a wall of the radiation section, a space is being provided between the plates and the wall of the radiation section. At least a part of the superheater is being arranged as a wall superheater in the space in the radiation section. This space contains a less corrosive gaseous atmosphere, which is at a higher pressure than the pressure of the gases in the combustion chamber. Hereby, it is possible to reach a high superheater temperature without corrosion to the final superheater, so that the superheater can be made from inexpensive material.

However, U.S. Pat. No. 6,269,754 does not provide direct contact between the flue gases and the mentioned superheaters, and accordingly there is a less efficient transfer of energy from the flue gases to the steam.

EP 0536268 B1—from the applicant—discloses a method and apparatus for incinerating different kinds of solid and possibly liquid waste material. Solid and possibly liquid waste material is incinerated by a) partial combustion on the stepped grates of the solid waste material, the latter being delivered to a rotary kiln at such a high temperature that a liquid slag is formed at the inlet of the rotary kiln, b) possibly adding liquid waste material to the solid waste material being incinerated on the stepped grates, and c) collecting the ash products from the combustion process, such as grate screenings, boiler ash, fly ash, and residual products from flue-gas cleaning, and returning these products to the input end of the rotary kiln, at which input end these products are introduced into the liquid slag. In this manner, it is achieved that the slag, fly ash and other harmful residual products from the combustion process are fused into a glass-like mass, from which salts and heavy metal cannot be leached out.

However, EP 0536268 B1 does not provide for an optimized power output from the incineration of the solid and liquid waste material.

In a world where natural energy resources, e.g. oil, is increasingly scarce, there is an increasing demand for energy supplied from other sources. When refuse is incinerated in a boiler, energy can be extracted from the incineration process. Thus it is important that the incineration process is optimized to provide steam that is not condensed and has a sufficient high temperature to ensure that the steam, when fed in a steam turbine driving a generator, provides a high and efficient power output. Such steam can e.g. be superheated steam.

Thus there is a need for a boiler optimized to provide a high electrical power output from superheated steam and an end superheater with a higher tube surface temperature.

Typically, superheated steam comes from a so-called end superheater. However, in a boiler some of the gases, e.g. flue gases and the ash particles, are corrosive, which, due to their corrosive nature, will attack said end superheater with the result that the lifetime of the end superheater is shortened.

Thus there is also a need for a boiler having an end superheater, where some means are provided to extend the lifetime of the end superheater.

These needs are fulfilled when the boiler comprising a separator element and an end superheater. The boiler is for drying, igniting and combusting refuse and producing steam by heat exchange with flue gases. Said boiler defines a main flow direction of gases, the separator element being adapted for separating said flue gases into streams of a less-corrosive gas flow and a corrosive gas flow, respectively. Said separator element is located substantially in and along said main flow direction, and said end superheater is located in proximity to said separator element and in the flow of said less-corrosive gas.

Hereby, the invention has the advantages that the lifetime of the end superheater of the boiler is increased and that the boiler also provides a high and efficient electrical power output due to the increased steam temperature in the end superheater.

Furthermore the end superheater can be applied at a higher temperature when subjected to cleaner gases, i.e. less-corrosive gas and ash particles.

Figure 2:
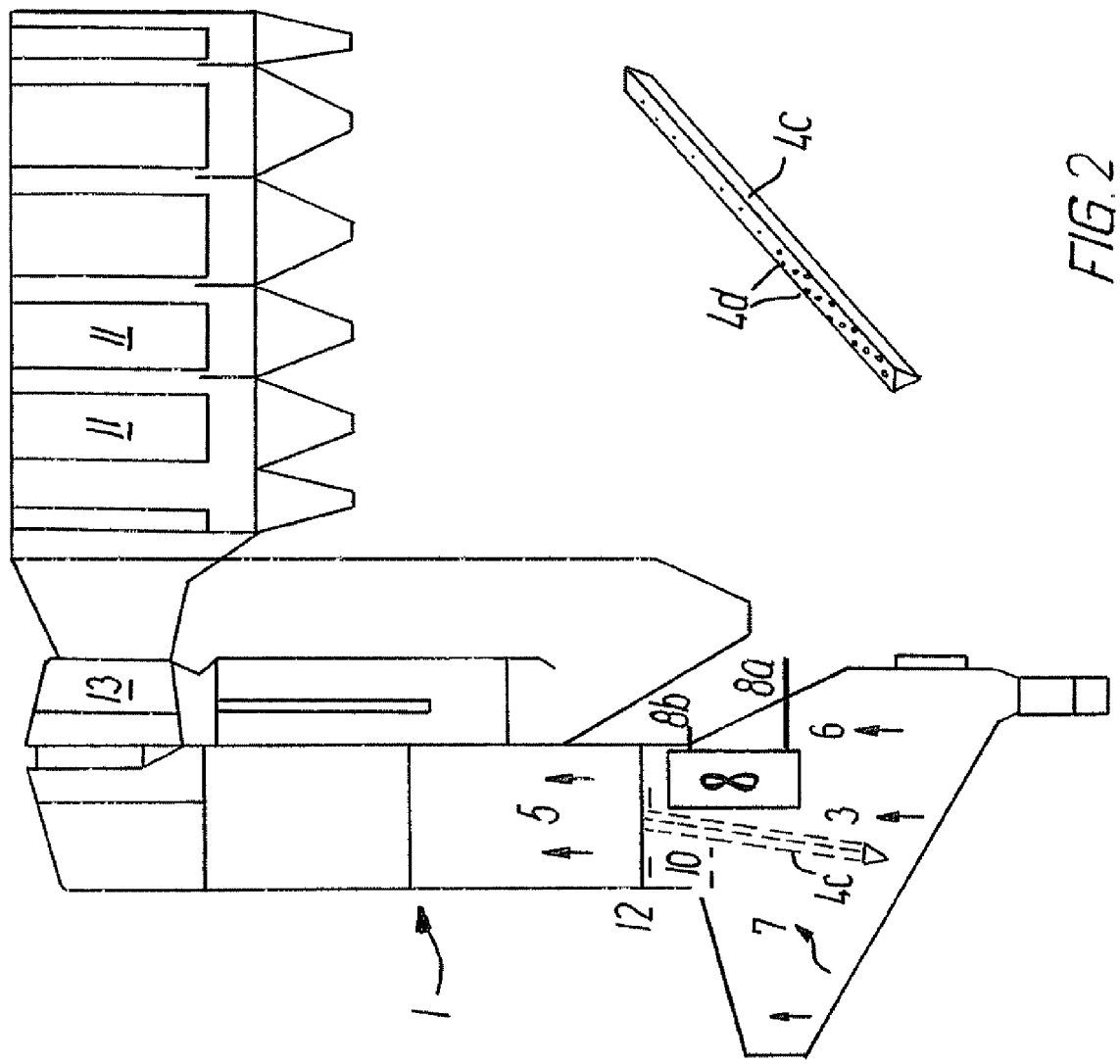

The invention will be explained more fully below in connection with preferred embodiments and with reference to the drawings, in which:

FIG. 1 shows a first embodiment of a boiler using a plate or a wall for separation of flue gases, and FIG. 2 shows the boiler using a pipe with nozzles for the separation.

Throughout the drawings, the same reference numerals indicate similar or corresponding features or functions.

In general the terms "superheater" or "end superheater" refers to a device that heats the steam generated by the boiler further, thereby increasing the thermal energy in the steam and decreasing the likelihood that said steam condenses. Steam, which has been superheated, is logically known as superheated steam; conversely, non-superheated steam is called saturated steam or wet steam. It is important to avoid the latter steam and thus primarily to use the superheated steam. Thus, when this latter steam is fed into a steam turbine driving a generator, it will provide a high and efficient electrical power output, especially if the temperature and the pressure of the steam are sufficiently high.

FIG. 1 shows a first embodiment of the boiler using a plate or a wall for separation of flue gases. In general, the boiler (1) dries, ignites and combusts refuse. When refuse is incinerated, a gaseous atmosphere, i.e. flue gases (3), are in the first place the results of incineration of the refuse.

Typically the refuse is transported within the boiler by means of grate blocks, e.g. reciprocable grates. In order to convey the refuse, the grates can be combined with one or more conveyors. Basically, the refuse is conveyed from the left to the right, i.e. when following the process of refuse-incineration—starting at reference numeral 3 with flue gases, proceeding to reference numeral 7 and ending at reference numeral 6—at reference numeral 7, a corrosive gas flow is the result, and conversely, at reference numeral 6, a less-corrosive gas flow is the result.

Said less-corrosive gas is essentially free from corrosive components, such as Cl, K, Na, Zn, Pb, whereas the corrosive gas comprises corrosive components, e.g. it comprises one or more of Cl, K, Na, Zn and Pb. In essence less-corrosive gas can be understood as gases which provide less corrosion on the end superheater.

At this point of the process, it is important that these gases are not mixed, since these, i.e. reference numerals 6 and 7, are to be treated differently. Consequently, accordingly to the invention, a separation is provided. Reference numeral 5 defines a main flow direction of the gases. Said separation of the flue gases (3) is performed by means of a separator element denoted with reference numeral 4. This element could in exemplary embodiments be provided as a plate (4a) or in the form of a wall (4b).

The plate (4a) is typically a water filled boiler tube panel extending from one boiler side wall, typically also a water filled boiler tube panel, to the other boiler side wall, and the plate is suspended on said side walls. The plate may be corrosion protected on the surfaces by e.g. high-alloy Cr—Ni overlay welding or by essentially tight refractory materials.

The wall (4b) is typically a reinforced brick or cast refractory wall extending from the one boiler sidewall to the other boiler sidewall. The reinforcement may be hollow, allowing for passage of a cooling medium being e.g. a liquid, a vapor, a gas or air.

Moreover, the separator element could in another exemplary embodiment be provided as a channel, i.e. said plate (4a) and wall (4b) could in various combinations be used to form the channel. The channel could also have a tubular shape.

The plate (4a) or the wall (4b), or a similar construction element satisfying the requirements set up above, is located substantially in and along the above-mentioned main flow direction (5) of the gases. Typically, the plate or wall is located parallel to said main flow direction.

Thus in general, said separator element (4) is adapted to be suspendable on or from the walls of the boiler (1).

Thus the separator element assures that the less corrosive gas flow (6) and the corrosive gas flow (7) are kept separated at this point. In one embodiment of the invention said separator element is adapted to be movable in a direction substantially perpendicular to said main flow direction (5). Hereby, when moved forth and back, the separator element can be positioned to ensure that one stream of gas substantially comprises corrosive elements, and the other stream of gas substantially comprises less corrosive elements. In the long run, the optimal position of the separator element may be reflected in a high and efficient power output from a generator driven by a steam turbine supplied with steam from the boiler.

The movable separator element may be a plate, a wall or channel able to pivot at the top in bearings suspended on the opposite boiler side walls and e.g. being able to move and fixate in different positions forwards/backwards at the bottom onto the boiler side walls.

Said separator element (4) is adapted to be suspendable from an upper zone (10) of the boiler (1).

FIG. 2 shows the boiler using a pipe for the separation.

As an alternative to the separator element, i.e. the plate, the wall or channel of the foregoing figure, a pipe can be used as the separator element for the separation of flue gases into the less-corrosive (6) and the corrosive gas flow (7), respectively. The pipe (4c) can be provided with one or more nozzles (4d). This or these is/are adapted to blow cool recirculated cleaned flue gas, following the main flow direction (5) in between the less-corrosive gas flow (6) and the corrosive gas flow (7), whereby these gas flows (6, 7) continue in two separated streams in the main flow direction (5). Said cool recirculated cleaned flue gas can be provided with an Industrial Draught fan with a tube system, taking part of the clean flue gas e.g. before the stack of the plant and sending this cool gas into the separation pipe.

Said nozzles can be provided in a random pattern in the pipe, or be provided in substantially the same direction along the pipe, or be provided in two or more rows substantially in the same direction along the pipe.

The nozzles must have a size and a design allowing injected cool gas to penetrate up between the burning flue gas streams (6) and (7), shaping these flue gas streams (6,7) up to a height being 10-20 times the vertical height of the horizontally positioned separation pipe.

Said pipe is located substantially perpendicular to said main flow direction (5), as can be seen at reference numeral 4c on the figure.

The separation pipe (4c) is suspended on the opposite boiler side walls, and the separation pipe is able to being moved and fixated around its axis and in different forward/backward positions onto the boiler sidewalls.

In one embodiment of the invention said pipe is adapted to be movable in a direction substantially perpendicular to said main flow direction (5). Hereby, when moved forth and back, the pipe can be positioned to ensure that one stream of gas substantially comprises corrosive elements, and the other stream of gas substantially comprises less corrosive elements. In the long run, the optimal position of the pipe may be reflected in a high and efficient power output when said generator is driven by said steam turbine, which is supplied with steam from the boiler.

When said less-corrosive gas (6) and the corrosive gas (7) together reach the mixing zone (10) of the boiler, these gases are mixed by injection of secondary combustion air for outburning, and the now mixed gases are cooled by means of the evaporator walls in the radiation zone and one or more superheaters (11), which produce steam (2) at between 300 and 450 degrees Celsius. This (i.e. cooling by means of said one or more superheaters) apply to both figures, i.e. regardless of whether the less corrosive gas (6) has been in contact with the pipe, the plate, the wall or the channel when it moved in the main flow direction (5).

This steam (2)—see FIG. 1—after leaving said one or more superheaters is then fed by means of one or more pipes to an inlet (8a) of an end superheater (8), through which this steam is heated, resulting in a temperature increase of between 25 and 200 degrees Celsius.

This warmer steam (2a), i.e. the steam with an increased temperature, is e.g. supplied from an outlet (8b) of the end superheater (8) to a steam turbine (14). Thus this steam (2a) can be utilized to produce electricity, e.g. said steam can be fed by means of piping from said outlet into the steam turbine (14), which drives a generator (15), from which generator electrical power then can be generated. Since warmer steam (2a) is the output from the boiler, i.e. the output from the end superheater, the boiler accordingly also provides a high power output efficiency. This is, of course, higher than if the steam (2) at between 300 and 450 degrees Celsius was the output from the boiler. Thus, the heating of the steam in said end superheater provides the high electrical power and high efficient output.

Typically, said end superheater (8) is located in proximity to said separator element (4), e.g. said plate, wall or into the channel or a cool gas carpet curtain above the separation pipe (4c), and in all cases in the flow (6) of said less-corrosive gas. It is thus an advantage that the end superheater is less subject to corrosion.

It is therefore an advantage that the end superheater is located in the flow (6) of said less-corrosive gas as compared to the flow (7) of said corrosive gas. If the end superheater was located in the flow (7) of said corrosive gas—which is not the case according to the invention—such location of the end superheater would result in a short life time of the end superheater, and this location in the aggressive environment would require excessive and frequent repair work due to the corrosive gases during its working life time.

Thus the means that is provided to extend the lifetime of the end superheater is the separating element that provides the less corrosive gas flow to which the end superheater is subjected, thereby avoiding that it is subjected to a corrosive gas flow.

The invention therefore has the advantages that the lifetime of the end superheater is increased and that the boiler provides a high electrical power efficiency.

As discussed above, said less corrosive gas (6) and the corrosive gas (7) are mixed together in the mixing zone (10) of the boiler (1). The boiler further comprises a blow unit (12). This blow unit is adapted to—by blowing secondary air—effectively mix said less-corrosive gas (6) with said corrosive gas (7), whereby said mix can be effectively burnt out before it reaches the top zone (13) of the boiler.

The invention claimed is:

1. A boiler for drying, igniting and combusting refuse and producing steam by heat exchange with flue gases, the flue gases being the results of incineration of the refuse and the flue gases including both a less-corrosive gas flow and a corrosive gas flow, the boiler defining a main flow direction of the flue gases, the boiler comprising a separator element and an end superheater, the separator element being positioned in the path of both the less-corrosive gas flow and the corrosive gas flow to separate the flue gases into streams of less-corrosive gas flow and corrosive gas flow, the separator element extending in a direction substantially along the main flow direction of the flue gases, the separator element comprising a pipe having one or more nozzles adapted to blow cool recirculated cleaned flue gases following the main flow direction in between the less-corrosive gas flow and the corrosive gas flow, wherein these gas flows continue in two separate streams in the main flow direction, and wherein the end superheater is located in proximity to the separator element and in the path of the less-corrosive gas flow.

2. The boiler according to claim 1, wherein a plurality of the separator elements forms a channel.

3. The boiler according to claim 1, wherein the pipe is located substantially perpendicular to the main flow direction.

4. The boiler according to claim 1, wherein the separator element is adapted to be movable in a direction substantially perpendicular to the main flow direction.

5. The boiler according to claim 1, wherein the separator element is adapted to be suspendable on or from the walls of the boiler.

6. The boiler according to claim 1, wherein the less-corrosive gas and corrosive gas are cooled by means of an evaporation wall in the radiation zone and one or more superheaters, which produce steam at between 300 and 450 degrees Celsius.

7. The boiler according to claim 6, wherein the steam is heated in the end superheater.

8. The boiler according to claim 6, wherein the end superheater heats the steam to become steam of an increased temperature, resulting in a temperature increase of between 25 and 200 degrees Celsius as compared to the temperature of the steam.

9. The boiler according to claim 1, wherein the less-corrosive gas is essentially free from Cl, K, Na, Zn and Pb.

10. The boiler according to claim 1, wherein the corrosive gas comprises one or more of Cl, K, Na, Zn and Pb.

11. The boiler according to claim 1 further comprising a blow unit adapted to, by blowing secondary air, effectively mix the less-corrosive gas with the corrosive gas, whereby the mix can be effectively burnt out before it reaches the top zone of the boiler.

12. The boiler according to claim 1, wherein steam leaving the end superheater at around 450 degrees Celsius is utilized to produce electricity, when the steam is fed into a steam turbine driving a generator.

13. A boiler for drying, igniting and combusting refuse and producing steam by heat exchange with flue gases, the flue gases being the results of incineration of the refuse and the flue gases including both a less-corrosive gas flow and a corrosive gas flow, the boiler defining a main flow direction of the flue gases, the boiler comprising a separator element and an end superheater, the separator element being positioned in the path of both the less-corrosive gas flow and the corrosive gas flow to separate the flue gases into streams of less-corrosive gas flow and corrosive gas flow, the separator element extending in a direction substantially along the main flow direction of the flue gases, the end superheater is located in proximity to the separator element and in the path of the less-corrosive gas flow, and comprising a blow unit adapted to, by blowing secondary air, effectively mix the less-corrosive gas with the corrosive gas, whereby the mix can be effectively burnt out before it reaches the top zone of the boiler.

* * * * *